US012739015B2

(12) United States Patent
Hakola et al.

(10) Patent No.: US 12,739,015 B2
(45) Date of Patent: Sep. 15, 2026

(54) FACILITATING MULTI-PANEL UE OPERATION WITH DIFFERENT PANEL CAPABILITIES

(71) Applicant: Nokia Technologies Oy, Espoo (FI)

(72) Inventors: Sami-Jukka Hakola, Oulu (FI); Juha Pekka Karjalainen, Oulu (FI); Samantha Caporal del Barrio, Aalborg (DK); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 326 days.

(21) Appl. No.: 18/556,813

(22) PCT Filed: May 24, 2022

(86) PCT No.: PCT/FI2022/050358

§ 371 (c)(1),
(2) Date: Oct. 23, 2023

(87) PCT Pub. No.: WO2022/254088

PCT Pub. Date: Dec. 8, 2022

(65) Prior Publication Data

US 2024/0137099 A1 Apr. 25, 2024
US 2024/0235652 A9 Jul. 11, 2024

Related U.S. Application Data

(60) Provisional application No. 63/195,992, filed on Jun. 2, 2021.

(51) Int. Cl.
*H04B 7/06* (2006.01)
*H04B 7/08* (2006.01)

(52) U.S. Cl.
CPC ..... *H04B 7/06966* (2023.05); *H04B 7/06956* (2023.05); *H04B 7/088* (2013.01)

(58) Field of Classification Search
CPC ............ H04B 7/06966; H04B 7/06956; H04B 7/088; H04B 7/0671; H04B 7/0404; H04B 7/0628; H04W 8/22; H04W 24/10
See application file for complete search history.

(56) References Cited

U.S. PATENT DOCUMENTS

2019/0052344 A1 2/2019 Kundargi et al.
2020/0229104 A1* 7/2020 MolavianJazi ....... H04W 52/54
(Continued)

FOREIGN PATENT DOCUMENTS

EP 3562052 A1 10/2019
EP 3584982 A1 12/2019
(Continued)

OTHER PUBLICATIONS

"3rd Generation Partnership Project; Technical Specification Group Radio Access Network; NR; Physical layer procedures for data (Release 16)", 3GPP TS 38.214, V16.5.0, Mar. 2021, pp. 1-171.
(Continued)

*Primary Examiner* — Mewale A Ambaye
(74) *Attorney, Agent, or Firm* — McCarter & English, LLP

(57) ABSTRACT

According to at least some example embodiments, a user equipment (UE), of a wireless communications system, for facilitating a dynamic association between reference signals (RSs) configured for beam management measurements and reporting, for downlink (DL) and/or uplink (UL) beam selection, and semi-statically configured capability indices of a capability set of at least one functionality, includes a plurality of antenna panels; memory storing computer-executable instructions which include generating at least a first capability set of a first functionality, the first capability set including a plurality of capability information items indexed, respectively, by a plurality of corresponding capability indices, each capability information item indicating,
(Continued)

for a panel corresponding to the capability information item from among the plurality of antenna panels, capability information of the corresponding panel with respect to the first functionality, and transmitting the first capability set to a next generation node B (gNB) included in the wireless communications system.

8 Claims, 6 Drawing Sheets

(56) References Cited

U.S. PATENT DOCUMENTS

| | | | | |
|---|---|---|---|---|
| 2020/0267536 | A1* | 8/2020 | Zhou | H04W 8/24 |
| 2020/0350976 | A1* | 11/2020 | Bai | H04B 7/0874 |
| 2021/0351888 | A1* | 11/2021 | Park | H04W 72/51 |

FOREIGN PATENT DOCUMENTS

| | | | | |
|---|---|---|---|---|
| EP | 3644522 A1 | | 4/2020 | |
| EP | 3820050 A1 | | 5/2021 | |
| EP | 3820050 B1 | * | 2/2024 | H04B 1/40 |
| JP | 2020509677 A | | 3/2020 | |
| JP | 2020511037 A | | 4/2020 | |
| WO | 2019/165224 A1 | | 8/2019 | |
| WO | 2019/193581 A2 | | 10/2019 | |
| WO | 2020/033622 A1 | | 2/2020 | |
| WO | 2020/168246 A1 | | 8/2020 | |

OTHER PUBLICATIONS

"3rd Generation Partnership Project; Technical Specification Group Radio Access Network; NR; Physical layer procedures for control (Release 16)", 3GPP TS 38.213, V16.5.0, Mar. 2021, pp. 1-183.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; NR; User Equipment (UE) radio access capabilities (Release 16)", 3GPP TS 38.306, V16.4.0, Mar. 2021, pp. 1-151.

"QCL/QCB design for NR MIMO", 3GPP TSG RAN WG1 Meeting #89, R1-1707134, Agenda Item: 7.1.2.4.5, ZTE, May 15-19, 2017, pp. 1-9.

"On QCL for NR", 3GPP TSG RAN WG1 Meeting #89, R1-1707369, Agenda item: 7.1.2.4.5, Intel Corporation, May 15-19, 2017, pp. 1-4.

"Discussion on QCL", 3GPP TSG RAN WG1 #89, R1-1708601, Agenda item: 7.1.2.4.5, Qualcomm Incorporated, May 15-19, 2017, pp. 1-3.

"On QCL", 3GPP TSG-RAN WG1 #89, R1-1708710, Agenda Item: 7.1.2.4.5, Ericsson, May 15-19, 2017, pp. 1-6.

"On QCL Framework and Configurations in NR": 3GPP TSG RAN WG1#89, R1-1708929, Agenda item: 7.1.2.4.5, Nokia, May 15-19, 2017, 6 pages,.

"Details of QCL assumptions and related RS design considerations", 3GPP TSG RAN WG1 Meeting #89, R1-1706940, Agenda item: 7.1.2.4.5, Huawei,HiSilicon, May 15-19, 2017, 6 pages.

International Search Report and Written Opinion received for corresponding Patent Cooperation Treaty Application No. PCT/FI2022/050358, dated Sep. 6, 2022, 17 pages.

Office action received for corresponding Indian Patent Application No. 202347089030, dated Jul. 8, 2025, 7 pages.

Extended European Search Report received for corresponding European Patent Application No. 22815426.6, dated Jul. 15, 2025, 13 pages.

Office action received for corresponding Japanese Patent Application No. 2023-573164, dated Mar. 11, 2025, 3 pages of office action and no page of translation available.

Partial European Search Report received for corresponding European Patent Application No. 22815426.6, dated Mar. 4, 2025, 12 pages.

"Enhancements on multi-beam operation", 3GPP TSG RAN WG1 #105-e, R1-2104266, Agenda item: 8.1.1, Huawei, May 10-27, 2021, 13 pages.

* cited by examiner

410

Example Capability Set for Functionality *MaxNumberOfRxBeams*

| Capability Index 412 | Capability Info. Item 414 | Corresponding Panel (channel conditions) 416 |
|---|---|---|
| #0 | MaxNumberOfRxBeams = 4 | Panel_1 |
| #1 | MaxNumberOfRxBeams = 3 | Panel_2 |
| #2 | MaxNumberOfRxBeams = 4 | Panel_3 (condition_A) |
| #3 | MaxNumberOfRxBeams = 2 | Panel_3 (condition_B) |
| #4 | MaxNumberOfRxBeams = 4 | Panel_4 |
| #5 | MaxNumberOfRxBeams = 4 | Panel_4 |
| #6 | MaxNumberOfRxBeams = 3 | Panel_5 (condition_C) |
| #7 | MaxNumberOfRxBeams = 1 | Panel_5 (condition_D) |

Example DL RS Set

| Capability Index 412 | DL RS 418 | Corresponding Panel (channel conditions) 416 |
|---|---|---|
| #0 | DL RS #b | Panel_1 |
| #1 | DL RS #d | Panel_2 |
| #2 | DL RS #p | Panel_3 (condition_A) |
| #3 | DL RS #i | Panel_3 (condition_B) |
| #4 | DL RS #o | Panel_4 |
| #5 | DL RS #p | Panel_4 |
| #6 | DL RS #f | Panel_5 (condition_C) |
| #7 | DL RS #g | Panel_5 (condition_D) |

FIG. 4B

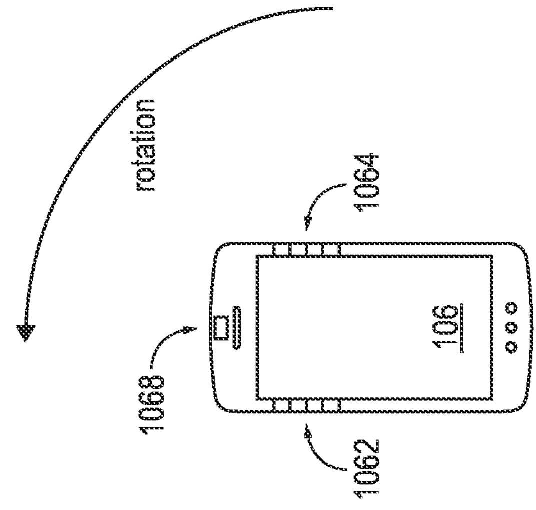
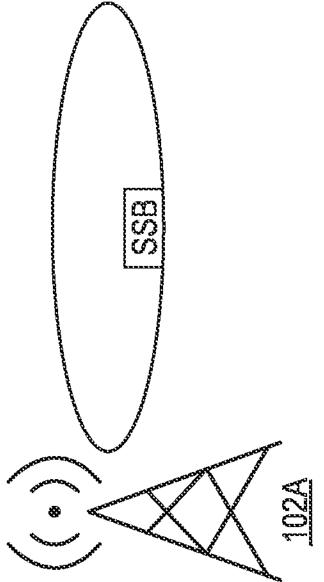
FIG. 5

FACILITATING MULTI-PANEL UE OPERATION WITH DIFFERENT PANEL CAPABILITIES

RELATED APPLICATION

This application was originally filed as PCT Application No. PCT/FI2022/050358 on May 24, 2022, which claims priority from U.S. Provisional Application No. 63/195,992, filed on Jun. 2, 2021, both of which are incorporated herein by reference in their entirety.

TECHNICAL FIELD

One or more example embodiments relate generally to wireless communications and, more specifically, to facilitating positioning in Third Generation Partnership Project (3GPP) Fifth Generation (5G) New Radio (NR) networks.

BACKGROUND

Fifth generation (5G) wireless communications networks are the next generation of mobile communications networks. Standards for 5G communications networks are currently being developed by the Third Generation Partnership Project (3GPP). These standards are known as 3GPP New Radio (NR) standards. One area of development in 3GPP New Radio (NR) technology is beam management between UEs and next generation Node Bs (gNBs).

SUMMARY

According to at least some example embodiments, a user equipment (UE), of a wireless communications system, for facilitating a dynamic association between reference signals (RSs) configured for beam management measurements and reporting, for downlink (DL) and/or uplink (UL) beam selection, and semi-statically configured capability indices of a capability set of at least one functionality, includes a plurality of antenna panels; memory storing computer-executable instructions; and a processor configured to execute the computer-executable instructions, wherein the computer-executable instructions include generating at least a first capability set of a first functionality, the first capability set including a plurality of capability information items indexed, respectively, by a plurality of corresponding capability indices, each capability information item indicating, for a panel corresponding to the capability information item from among the plurality of antenna panels, capability information of the corresponding panel with respect to the first functionality, and transmitting the first capability set to a next generation node B (gNB) included in the wireless communications system.

The plurality of capability information items included in the first capability set may include at least first and second capability information items indexed by first and second indices, respectively, from among the plurality of capability indices, wherein the first capability information item indicates capability information of a first panel, from among the plurality of antenna panels, with respect to the first functionality, and wherein the second capability information item indicates capability information of a second panel, from among the plurality of antenna panels, with respect to the first functionality, the second panel being different than the first panel.

The plurality of capability information items included in the first capability set may include at least first and second capability information items indexed by first and second indices, respectively, from among the plurality of capability indices, wherein the first capability information item indicates capability information of a first panel, from among the plurality of antenna panels, with respect to the first functionality and first DL and/or UL channel conditions, and wherein the second capability information item indicates capability information of the first panel with respect to the first functionality and second DL and/or UL channel conditions, the second DL and/or UL channel conditions being different than the first DL and/or UL channel conditions.

The first functionality may be at least one of a maximum number of Rx beams, a number of ports, activation delay group information, selection delay group information, or a maximum achievable equivalent isotropically radiated power (EIRP).

The computer-executable instructions may further include receiving and measuring downlink (DL) reference signals (RSs) from the gNB; starting a timer after measuring the DL reference signals; determining, for each capability index from among the plurality of capability indices included in the first capability set, one or more best DL RSs from among the received DL RSs; determining one or more fallback RSs, from among the received DL RSs, for a fallback operation; reporting, to the gNB, each capability index along with the one or more best DL RSs determined for each capability index; reporting, to the gNB, the one or more fallback RSs; determining, based on the one or more best DL RSs determined for a capability index from among the plurality of capability indices, an Rx beam for receiving DL signals and/or a Tx beam for transmitting UL signals; determining whether the timer has expired; and in response to determining the timer has expired, performing the fallback operation, the fallback operation including, determining, based on the one or more fallback RSs, a new Rx beam for receiving DL signals and/or a new Tx beam for transmitting UL signals.

According to at least some example embodiments, a network element, of a wireless communications system, for facilitating a dynamic association between reference signals (RSs) configured for beam management measurements and reporting, for downlink (DL) and/or uplink (UL) beam selection, and semi-statically configured capability indices of a capability set of at least one functionality, includes memory storing computer-executable instructions; and a processor configured to execute the computer-executable instructions, wherein the computer-executable instructions include transmitting, to a user equipment (UE), downlink (DL) reference signals (RSs); and receiving, from the UE, a at least a first capability set of a first functionality, the first capability set including a plurality of capability information items indexed, respectively, by a plurality of corresponding capability indices, each capability information item indicating, for a panel corresponding to the capability information item from among a plurality of antenna panels of the UE, capability information of the corresponding panel with respect to the first functionality.

7. The first functionality may include at least one of a maximum number of Rx beams, a number of ports, activation delay group information, selection delay group information, or a maximum achievable equivalent isotropically radiated power (EIRP).

According to at least some example embodiments, a method of operation a user equipment (UE), of a wireless communications system, for facilitating a dynamic association between reference signals (RSs) configured for beam management measurements and reporting, for downlink (DL) and/or uplink (UL) beam selection, and semi-statically configured capability indices of a capability set of at least one functionality, the UE including a plurality of antenna panels, includes generating at least a first capability set of a first functionality, the first capability set including a plurality of capability information items indexed, respectively, by a plurality of corresponding capability indices, each capability information item indicating, for a panel corresponding to the capability information item from among the plurality of antenna panels, capability information of the corresponding panel with respect to the first functionality, and transmitting the first capability set to a next generation node B (gNB) included in the wireless communications system.

The plurality of capability information items included in the first capability set may include at least first and second capability information items indexed by first and second indices, respectively, from among the plurality of capability indices, wherein the first capability information item indicates capability information of a first panel, from among the plurality of antenna panels, with respect to the first functionality, and wherein the second capability information item indicates capability information of a second panel, from among the plurality of antenna panels, with respect to the first functionality, the second panel being different than the first panel.

The plurality of capability information items included in the first capability set may include at least first and second capability information items indexed by first and second indices, respectively, from among the plurality of capability indices, wherein the first capability information item indicates capability information of a first panel, from among the plurality of antenna panels, with respect to the first functionality and first DL and/or UL channel conditions, and wherein the second capability information item indicates capability information of the first panel with respect to the first functionality and second DL and/or UL channel conditions, the second DL and/or UL channel conditions being different than the first DL and/or UL channel conditions.

The first functionality may include at least one of a maximum number of Rx beams of the panel, a number of ports of the panel, activation delay group information of the panel, selection delay group information of the panel, or a maximum achievable equivalent isotropically radiated power (EIRP) of the panel.

The method may further include receiving and measuring downlink (DL) reference signals (RSs) from the gNB; starting a timer after measuring the DL reference signals; determining, for each capability index from among plurality of capability indices in the in the capability set, one or more best DL RSs from among the received DL RSs; determining one or more fallback RSs, from among the received DL RSs, for a fallback operation; reporting, to the gNB, each capability index along with the one or more best DL RSs determined for each capability index; reporting, to the gNB, the one or more fallback RSs; determining, based on the one or more best DL RSs determined for a capability index from among the plurality of capability indices, an Rx beam for receiving DL signals and/or a Tx beam for transmitting UL signals; determining whether the time has expired; and in response to determining the timer has expired, performing the fallback operation, the fallback operation including, determining, based on the one or more fallback RSs, a new Rx beam for receiving DL signals and/or a new Tx beam for transmitting UL signals.

According to at least some example embodiments, a method of operating a network element, of a wireless communications system, for facilitating a dynamic association between reference signals (RSs) configured for beam management measurements and reporting, for downlink (DL) and/or uplink (UL) beam selection, and semi-statically configured capability indices of a capability set of at least one functionality, includes transmitting, to a user equipment (UE), downlink (DL) reference signals (RSs); and receiving, from the UE, at least a first capability set of a first functionality, the first capability set including a plurality of capability information items indexed, respectively, by a plurality of corresponding capability indices, each capability information item indicating, for a panel corresponding to the capability information item from among a plurality of antenna panels of the UE, capability information of the corresponding panel with respect to the first functionality.

The first functionality may include at least one of a maximum number of Rx beams, a number of ports, activation delay group information, selection delay group information, or a maximum achievable equivalent isotropically radiated power (EIRP).

According to at least some example embodiments, a user equipment (UE), of a wireless communications system, for facilitating a dynamic association between reference signals (RSs) configured for beam management measurements and reporting, for downlink (DL) and/or uplink (UL) beam selection, and semi-statically configured capability indices of a capability set of at least one functionality, includes generating means for generating at least a first capability set of a first functionality, the first capability set including a plurality of capability information items indexed, respectively, by a plurality of corresponding capability indices, each capability information item indicating, for a panel corresponding to the capability information item from among a plurality of antenna panels of the UE, capability information of the corresponding panel with respect to the first functionality, and transmitting means for transmitting the first capability set to a next generation node B (gNB) included in the wireless communications system.

According to at least some example embodiments, a network element, of a wireless communications system, for facilitating a dynamic association between reference signals (RSs) configured for beam management measurements and reporting, for downlink (DL) and/or uplink (UL) beam selection, and semi-statically configured capability indices of a capability set of at least one functionality, includes transmitting means for transmitting, to a user equipment (UE), downlink (DL) reference signals (RSs); and receiving means for receiving, from the UE, at least a first capability set of a first functionality, the first capability set including a plurality of capability information items indexed, respectively, by a plurality of corresponding capability indices, each capability information item indicating, for a panel corresponding to the capability information item from among a plurality of antenna panels of the UE, capability information of the corresponding panel with respect to the first functionality.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIG. 4A illustrates an example of a capability set according to at least some example embodiments.

FIG. 4B illustrates an example of a downlink (DL) reference signal (RS) set according to at least some example embodiments.

FIGS. 5, 6A and 6B are diagrams for explaining example timer reset triggers according to at least some example embodiments.

Figure 1:
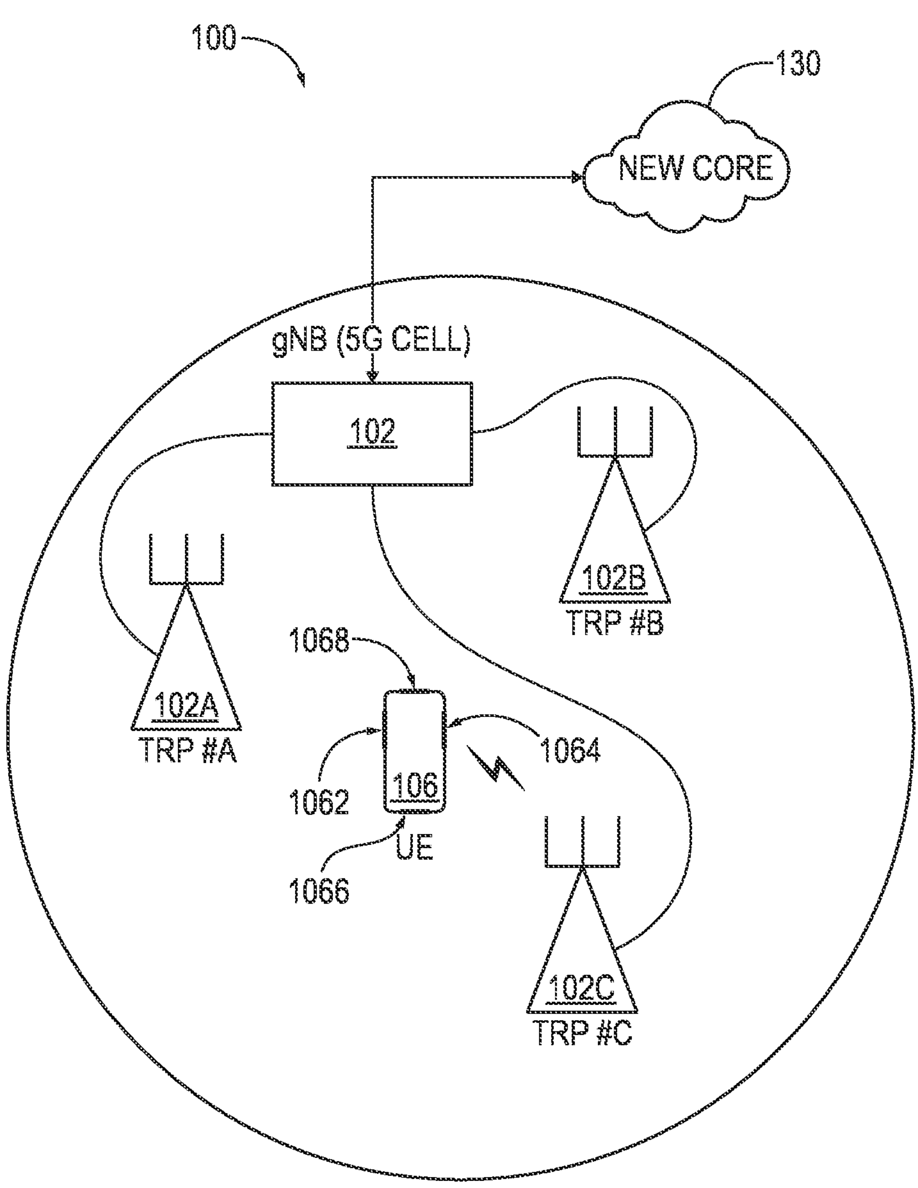
FIG. 1 is a diagram illustrating a portion of a wireless communications system according to at least some example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

1. Overview of NR Beam Management

Current 3GPP release 17 (Rel-17) and legacy NR releases define beam management procedures. One of the key aspects is the possibility of the UE to perform beam management operations, these being typically governed by various rules such as quasi-co-location (QCL) and time offsets which are reported by the UE sometimes as UE capabilities. Beam management comprises a set of procedures and functionalities that enable, maintain and refine the transmit (Tx) and receive (Rx) beam alignment between the transmitter and the receiver(s). A beam pair link established between the transmitter and the receiver comprises a transmit beam and receive beam pair. The beam pair link between a next generation Node B (gNB) and user equipment (UE) may be the same or different in downlink (DL) and uplink (DL). With respect to the DL, the gNB provides the UE with a QCL-TypeD reference signal (RS) based on which the UE can set its receive beam. With respect to the UL, the gNB provides the UE with spatial relation info based on which the UE can further set its transmit beam.

The quasi co-location of two antenna ports means that the channel conditions for the symbols transmitted from those antenna ports are similar and can be inferred from one to another. Depending on the set of properties for the channel conditions, 3GPP technical specification (TS) 38.214 defines the following QCL-types: QCL-TypeA, QCL-TypeB, QCL-TypeC, QCL-TypeD. With QCL-TypeD, the spatial Rx parameter is employed to define the channel conditions and is used to support beamforming.

QCL defines the relation between two reference signals at the UE receiver. In practice, the gNB may only be able to guarantee that the properties of two reference signals are similar if the two reference signals are transmitted from the same transmission and reception point (TRP). NR considers in general that the transmission of any reference signal can take place from any TRP.

With respect to the definition of QCL-TypeD, at the time of 3GPP Release 15 (Rel-15), a number of proposals, with respect to the spatial parameters, were made including, for example:

- Using average angle of arrival (AoA), power angular spectrum (PAS) of AoA, average angle of departure (AoD), PAS of AoD, transmit/receive channel correlation, transmit/receive beamforming, etc. (3GPP technical specification group (TSG) RAN meeting contribution document (TDoc) R1-170694).
- Capturing AoA in the QCL parameters set to describe the spatial channel properties of the RS antenna ports observed at the receiver. (3GPP TSG RAN TDoc R1-1707134)
- Using mean AoA and AoA spread. (3GPP TSG RAN TDoc R1-1707369)
- Considering angular domain parameters at the arrival, e.g., mean AoA/zenith angle of arrival (ZoA) and/or angle spread at arrival (ASA)/zenith angle spread at arrival (ZSA), as spatial QCL parameters. (3GPP TSG RAN TDoc R1-1708601)
- Spatial channel correlation. (3GPP TSG RAN TDoc R1-1708710)
- Using a generic term "spatial parameters" and deferring to 3GPP TSG RAN working group 4 (RAN4) in performance testing of the actual feature utilization of this characteristic. (3GPP TSG RAN TDoc R1-1708929)

The generic term approach is used in 3GPP technical specification (TS) 38.214, section 5.1.5:

The quasi co-location types corresponding to each DL RS are given by the higher layer parameter qcl-Type in QCL-Info and may take one of the following values:

- 'typeA': {Doppler shift, Doppler spread, average delay, delay spread}
- 'typeB': {Doppler shift, Doppler spread}
- 'typeC': {Doppler shift, average delay}
- 'typeD': {Spatial Rx parameter}

A QCL-TypeD RS spatial source can be a synchronization signal block (SSB) or a channel state information reference signal (CSI-RS). In beam indication for the target signal to be received (e.g. DM-RS of physical downlink shared channel (PDSCH), DM-RS of physical downlink control channel (PDCCH), CSI-RS) the UE is provided a TCI state (container) that comprises an indication of the QCL-TypeD RS. The UE applies the same receive (Rx) beam to receive target signal, as it used to receive the given QCL-TypeD source RS (SSB or CSI-RS resource) in the transmission coordination indication (TCI) state. The UE can be configured with up to 64 or 128 (if UE capability allows) TCI states. The TCI state container is defined by the TCI-State information element (IE) in 3GPP TS 38.331 as follows:

TCI-State IE

```
TCI-State ::=            SEQUENCE {
  tci-StateId              TCI-StateId,
  qcl-Type1                QCL-Info,
  qcl-Type2                QCL-Info    OPTIONAL,    -- Need R
  ...
}
QCL-Info ::=             SEQUENCE {
  cell                   ServCellIndex OPTIONAL,    -- Need R
  bwp-Id                   BWP-Id    OPTIONAL, -- Cond CSI-RS-Indicated
  referenceSignal            CHOICE {
    csi-rs                   NZP-CSI-RS-ResourceId,
    ssb                      SSB-Index
  },
  qcl-Type                 ENUMERATED {typeA, typeB, typeC, typeD},
  ...
}
```

In the UL, the UE is provided a spatial source RS. It can be an SSB, CSI-RS or sounding reference signal (SRS). When SSB or CSI-RS is provided as a spatial source, the UE uses the Rx beam used to receive the given SSB or CSI-RS resource as a spatial relation for the Tx beam to transmit a target signal (e.g. physical uplink shared channel (PUSCH), physical uplink control channel (PUCCH), SRS). When the SRS is provided as a spatial source, the UE uses, as a Tx beam to transmit a target signal, the same Tx beam as is used to transmit the given SRS resource. The spatial relation information for SRS is defined by the SRS-COnfig IE in TS 3GPP 38.331 as follows:

SRS-Config IE

```
SRS-SpatialRelationInfo ::=   SEQUENCE {
  servingCellId           ServCellIndex OPTIONAL,    -- Need S
  referenceSignal           CHOICE {
    ssb-Index                 SSB-Index,
    csi-RS-Index                NZP-CSI-RS-ResourceId,
    srs                     SEQUENCE {
      resourceId                SRS-ResourceId,
      uplinkBWP                   BWP-Id
    }
  }
}
```

The main procedures and functionalities in beam management are:

- Measurements and reporting of candidate reference signals that can act as a source to determine transmit and receive beam pair in downlink and in uplink.
  - A typical assumption is that DL RSs are used for both DL and UL beam indication.
    - TX/RX beam correspondence may be assumed at the UE.
  - The UE may be explicitly configured with SSB and/or CSI-RS resources for layer 1 (L1)-reference signal received power (RSRP) measurements and reporting (CSI-RS framework).
    - The UE may be configured with a CSI-RS resource setting for up to 16 CSI-RS resource sets having up to 64 resources within each set. The total number of different CSI-RS resources over all resource sets may be no more than 128.
  - The UE reports the L1-RSRP of {1, 2, 3 or 4} best SSBs or CSI-RSs per report configuration.
    - The reporting includes a resource index and L1-RSRP value.

Beam indication/Beam switching

- In the DL, the UE is provided a TCI state for the target signal, based on which the UE can receive the target signal. The TCI state is provided:
  - with a radio resource control (RRC) configuration for periodic channel state information reference signal (P-CSI-RS) (including total radiated sensitivity (TRS));
  - with a medium access control (MAC)-control element (CE) for PDCCH (one active TCI state per control resource set (CORESET)), semi-persistent channel state information reference signal (SP-CSI-RS), aperiodic channel state information reference signal (AP-CSI-RS), PDSCH (when follows PDCCH); or
  - with a downlink control indicator (DCI) for PDSCH (when explicit indication in use), and AP-CSI-RS (triggering of certain CSI-RS resource set(s).
- In UL, the UE is provided a spatial relation for the target signal based on which the UE forms the Tx beam. The provisioning of the spatial relation is:
  - RRC based (for P-SRS);
  - MAC-CE based (for SP-SRS, AP-SRS, PUCCH, PUSCH (when follows PUCCH with resource ID=0)); or
  - DCI based (indirectly for PUSCH (DCI indicates reference SRS(s) so that UE shall transmit PUSCH with the same beam(s) as it transmitted given SRSs)).
- Also, some default beam assumptions have been defined in Rel15/Rel16 including, for example:
  - PDSCH:
    - If scheduling offset<timeDurationForQCL: The TCI state is the one of the lowest CORESET ID in the latest slot monitored by UE.
    - If scheduling offset>=timeDurationForQCL: The TCI state is the one of the CORESET of the scheduling PDCCH if TCI state is not provided in the DCI, or PDSCH reception is based on the TCI state provided in DCI.
  - AP-CSI-RS:
    - If scheduling offset<beamSwitchTiming: the UE may either align the TCI state with an overlapping other signal TCI state, or apply the TCI state of the lowest CORESET ID in the latest slot monitored by UE.
  - PUCCH/SRS:
    - If the spatial relation is not configured, in frequency range 2 (FR2), determine the spatial relation as follows:

in a case when CORESET(s) are configured on the CC, the TCI state/QCL assumption follows the one of the CORESET with the lowest ID, or in a case when any CORESETs are not configured on the CC, the activated TCI state with the lowest ID is applicable to the PDSCH in the active DL bandwidth part (DL-BWP) of the CC.

PUSCH scheduled by DCI format 0_0:

When there are no PUCCH resources configured on the active UL BWP CC in FR2 and in RRC-connected mode:

The default spatial relation is the TCI state/QCL assumption of the CORESET with the lowest ID.

In a multi-TRP scenario, a TCI codepoint may include two TCI states and, as a default beam case, the UE assumes the TCI states of the TCI codepoint with two TCI states with the lowest ID (e.g. for PDSCH).

2. Issues with NR Beam Management for Multi-Panel UEs (MP-UEs)

One issue with NR beam management that may arise with respect to MP-UEs is that current specifications, e.g., 3GPP release 15 (Rel-15) and 3GPP release 16 (Rel-16) versions of NR, do not account for different capabilities the individual panels of the UE may have. Examples of such different capabilities include, but are not limited to:

- different numbers of antenna elements among the panels, which impacts, e.g., the number of receive (Rx) and transmit (Tx) beams the panel would require to fill a certain spatial aperture with a maximum gain or, alternatively, a gain of a desired level;
- different numbers of antenna ports among the panels, which impacts, e.g., the SRS resource configuration for codebook based PUSCH; and
- different equivalent isotropically radiated power (EIRP) capabilities for the UL transmissions of the different panels.

Due to different UE panels having different beamforming capabilities, the gNB may not be able to properly configure the UE with a number of the CSI-RS resources, e.g., for Rx beam training. According to conventional techniques, the UE provides only a single capability, a maximum number of receive beams maxNumberRxBeam. However, the gNB does not know whether the provided maxNumberRxBeam value is a maximum of Rx beams that are associated with a panel from among all the numbers of Rx beams associated with all the panels of the UE, respectively, or a total number of Rx beams the UE supports over all the panels. Accordingly, the lack of panel-specific knowledge at the gNB for a current serving panel of the UE may be problematic, for example, with respect to Rx beamforming procedures performed between the UE and the gNB.

Another issue with NR beam management that may arise with respect to MP-UEs concerns codebook based PUSCH. For example, when a UE is equipped with an antenna panel configuration that includes different numbers of antenna ports per antenna panel, codebook based PUSCH transmission with one or more beams can be enabled by configuring the PUSCH with txConfig set to 'codebook' and ULFPTxModes set to 'Mode 2'. Moreover, it is assumed that the UL SRS set is configured as 'codebook' with a maximum of four SRS resources with different numbers of antenna ports per resource where resources can have up to 2 different spatial relations.

Due to different UL transmission capabilities, i.e. number of antenna ports, per UL SRS resource, the lack of per-panel capability information at the gNB negatively impacts the configuring of different DL RS/signal resources as spatial sources for different UL SRS resources within an SRS set or, potentially, across different SRS sets. Currently, the Rel-15/Rel-16 specification (e.g., 3GPP TS 38.214) does not provide any mechanism for allowing the network (e.g., the gNB) to obtain awareness regarding which DL RS/signal is feasible for each SRS resource. Therefore, the gNB may configure/activate infeasible or undesirable spatial sources for each SRS resource, and thus, for each UE antenna panel. For example, a gNB may configure a DL RS #A as a spatial source for a SRS resource #0 (corresponding to an antenna panel #0 of a UE), even though the DL RS #A may be feasible for the SRS resource #1 (corresponding to an antenna panel #1 of the UE) but not for the SRS resource #0. In general, the above-referenced problems arise due to current DL RS reporting for DL and UL beam selection being UE panel agnostic. However, having different panel capabilities reflected e.g. in the SRS resource configuration (number of ports) would require panel aware reporting, which may not be desirable.

Solution(s) that can facilitate UE multi-panel operation by taking into account panel specific capabilities which may be different from panel to panel, while not requiring explicit panel identification, would be advantageous. For example, it may be desirable to develop a solution that abstracts the UE's panel implementation.

As is discussed in greater detail below, methods for facilitating beam management for MP-UEs according to at least some example embodiments include using indices to support the reporting of capability information of a UE to the network (e.g., to a gNB) on a per-panel basis.

Examples of an architecture of a wireless communications network and a structure of a network element, according to at least some example embodiments, will now be discussed below with reference to FIGS. 1 and 2.

3. Example Architecture of a Wireless Communications System and an Example Structure of a Network Element Thereof.

FIG. 1 illustrates a simplified diagram of a portion of a 3rd Generation Partnership Project (3GPP) New Radio (NR) access deployment for explaining example embodiments in more detail.

Referring to FIG. 1, wireless communications system 100 is an example of a 3GPP NR radio access deployment includes a gNB 102 having transmission and reception points (TRPs) 102A, 102B, 102C. Each TRP 102A, 102B, 102C may be, for example, a remote radio head (RRH) or remote radio unit (RRU) including at least, for example, a radio frequency (RF) antenna (or antennas) or antenna panels, and a radio transceiver, for transmitting and receiving data within a geographical area. In this regard, the TRPs 102A, 102B, 102C provide cellular resources for user equipment (UEs) (e.g., UE 106) within a geographical coverage area. In some cases, baseband processing may be divided between the TRPs 102A, 102B, 102C and gNB 102 in a 5th Generation (5G) cell. Alternatively, the baseband processing may be performed at the gNB 102. In the example shown in FIG. 1, the TRPs 102A, 102B, 102C are configured to communicate with UE 106 via one or more transmit (TX)/receive (RX) beam pairs. The gNB 102 communicates with the core network (CN) 130, which is referred to as the New Core or 5G core (5GC) in 3GPP NR.

The TRPs 102A, 102B, 102C may have independent schedulers, or the gNB 102 may perform joint scheduling among the TRPs 102A, 102B, 102C.

Although only a single UE 106 is shown in FIG. 1, the gNB 102 and TRPs 102A, 102B, 102C may provide communication services to a relatively large number of UEs within the coverage area of the TRPs 102A, 102B, 102C. For the sake of clarity of example embodiments, communication services (including transmitting and receiving wireless signals) will be discussed as between the gNB 102 and the UE 106. It should be understood, however, that signals may be transmitted between the UE 106 and one or more of the TRPs 102A, 102B, 102C.

The UE 106 includes a plurality of panels 1062, 1064, 1066 and 1068 for transmitting and receiving data to and from the gNB 102 on the UL and DL. Although only four antenna panels are shown in FIG. 1, example embodiments should not be limited to this example. Example functionality and operation of the UE 106 will be discussed in more detail below. Examples of the UE 106 include, but are not limited to, a mobile device, a tablet, a laptop computer, a wearable device, an Internet of Things (IoT) device, a desktop computer and/or any other type of stationary or portable device capable of operating according to the 5G NR communication standard, and/or other wireless communication standard. In the example illustrated in FIG. 1, the UE 106 is a mobile device.

According to at least some example embodiments, the wireless communications system 100 is not limited to the elements illustrated in FIG. 1 and the wireless communications system 100 may include numbers of constituent elements different than those shown in FIG. 1. For example, the wireless communications system 100 may include any number of UE devices, any number of gNBs, etc.

Additionally, though not illustrated, the CN 130 may include a number of 5GC network elements. For example, the gNB 102 may be connected to a location management function (LMF), an access and mobility management function (AMF) element and/or a session management function (SMF) element. Additionally, though not illustrated, the wireless communications system 100 may further include long-term evolution (LTE) network elements that are connected to the gNB 102. Examples of such LTE elements include, but are not limited to, LTE radio access technology (RAT) network elements (e.g., evolved universal mobile telecommunications system (UMTS) terrestrial radio access network (E-UTRAN) network elements) such as evolved node Bs (eNBs), and LTE core network elements (e.g., evolved packet core (EPC) network elements) such as mobility management entities (MMEs). An example structure which may be used to embody one or more radio network elements (e.g., gNBs, UEs, etc.) of the wireless communications system 100 will now be discussed below with respect to FIG. 2.

Figure 2:
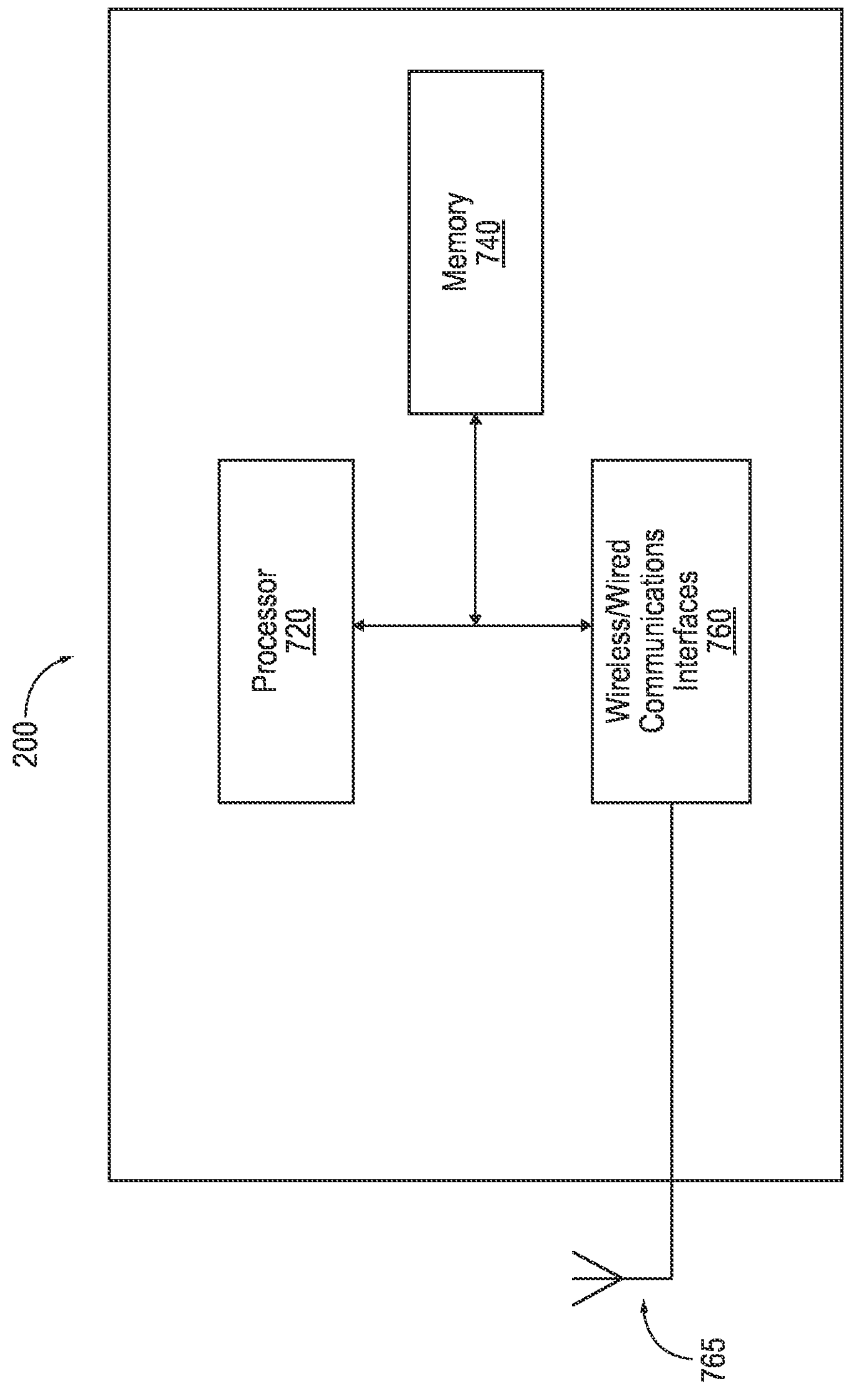
FIG. 2 illustrates a network element according to at least some example embodiments.

FIG. 2 illustrates an example embodiment of a network element. Referring to FIG. 2, a network element 200 includes: a memory 740, a processor 720, and various communications interfaces 760 connected to each other; and one or more antennas or antenna panels 765 connected to the various communications interfaces 760. The various interfaces 760 and the antenna 765 may constitute a transceiver for transmitting/receiving data to/from a UE, a gNB, a CN node, a CN element, and/or another radio network element via one or more of a plurality of wireless beams. According to at least some example embodiments, in addition to, or alternatively, instead of, including interfaces for supporting wireless communications, various interfaces 760 may include interfaces for supporting wired communications.

As will be appreciated, depending on the implementation of the network element 200, the network element 200 may include many more components than those shown in FIG. 2 for providing the functionalities of the particular element of the wireless communications system 100 being embodied by the network element 200 (e.g., functionalities of a UE, a CN element, a gNB, etc. in accordance with one or more example embodiments). However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the particular element of the wireless communications system 100 being embodied by the network element 200 (e.g., functionalities of a UE, a CN element and/or node, a gNB, etc. in accordance with one or more example embodiments) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium. According to at least some example embodiments, the memory 740 may store computer-executable instructions corresponding to any or all steps discussed with reference to FIGS. 1-3

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the one or more antennas 765, or other input/output components. As will be understood, the various interfaces 760 and programs stored in the memory 740 to set forth the special purpose functionalities of the network element 200 will vary depending on the particular element of the wireless communications system 100 being embodied by the network element 200.

The various interfaces 760 may also include one or more user input devices (e.g., a keyboard, a keypad, a mouse, or the like) and user output devices (e.g., a display, a speaker, or the like).

Example methods for facilitating beam management for MP-UEs will now be discussed below with reference to FIGS. 1-3.

4. Example Methods for Facilitating Beam Management for MP-UEs

Methods for facilitating beam management for MP-UEs according to at least some example embodiments may support, for example, any or all of:

- panel capability aware UE receive beam training;
- panel capability aware codebook (CB) based PUSCH transmission; and
- panel capability aware SRS based UL beam search and selection.

Figure 3:
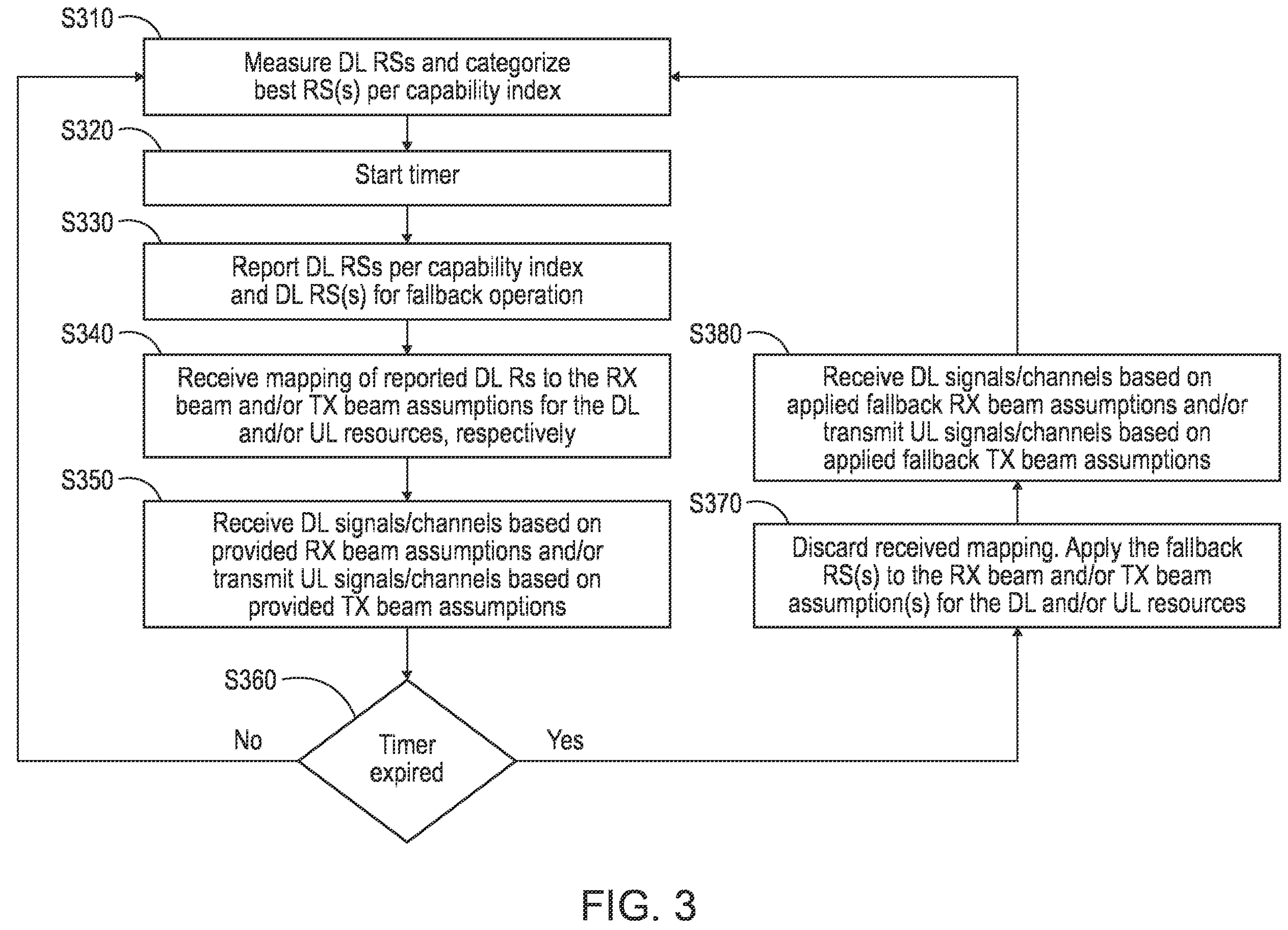
FIG. 3 illustrates a method for facilitating beam management for an MP-UE according to at least some example embodiments.

FIG. 3 illustrates a method for facilitating beam management for an MP-UE according to at least some example embodiments. FIG. 3 will be explained with reference to the UE 106 and the gNB 102 of the wireless communications system 100 illustrated in FIG. 1. For ease of explanation, FIG. 3 will be explained with reference to an example scenario in which the UE 106 includes at least 5 UE panels: Panel_1-Panel_5. Referring to FIG. 3, a method for facilitating beam management for an MP-UE according to at least some example embodiments may include, for example, the following operations:

1. The UE 106 may provide, to the gNB 102, a set of Tx and/or Rx capabilities (hence DL reception and UL transmission) corresponding to a particular functionality. According to at least some example embodiments, the set of Tx and/or Rx capabilities may be encapsulated into a semi-statistically configured capability set with indices.

Examples of such capabilities include, but are not limited to, maxNumberRxBeam, nrOfPorts, activationDelayGroup, selectionDelayGroup, maximumAchievableEIRP with indices.

For example, FIG. 4A illustrates an example of a capability set according to at least some example embodiments. Referring to FIG. 4A, a capability set 410 includes a plurality of capability indices 412 which correspond, respectively, to a plurality of capability information items 414. As is also illustrated in FIG. 4A, the plurality of capability indices correspond, respectively, to a plurality of panels 416 of a UE. According to at least some example embodiments, the UE 106 may provide the capability set 410 to the gNB 102.

In the example illustrated in FIG. 4A, the functionality to which the capability set 410 corresponds is a maximum number of Rx beams of a UE panel (i.e., MaxNumberOfRxBeams). Accordingly, in the example illustrated in FIG. 4A, each capability information item among the plurality of capability information items 414 identifies a value of a maximum number of Rx beams, MaxNumberOfRxBeams, of the UE panel corresponding to the capability index to which the capability information item corresponds. As an example, for index #1 in the capability set 410, MaxNumberOfRxBeams=3. Further, as is illustrated in FIG. 4A, a UE panel to which index #1 corresponds is Panel_2. Accordingly, in the example illustrated in FIG. 4, for UE panel Panel_2, MaxNumberOfRxBeams=3.

According to at least some example embodiments, two or more capability indices may correspond, respectively, to two or more different UE panels. For example, in FIG. 4A, capability indices #1 and #2 correspond, respectively, to UE panel Panel_1 and UE panel Panel_2.

According to at least some example embodiments, two or more capability indices may correspond, respectively, to two or more different channel conditions experienced by the same UE panel. For example, in FIG. 4A, capability index #2 corresponds to UE panel Panel_3 with respect to channel condition condition_A and capability index #3 corresponds to UE panel Panel_3 with respect to channel condition condition_B.

According to at least some example embodiments, two or more capability indices may correspond to the same UE panel, without regard to channel conditions experienced by the UE panel. For example, in FIG. 4A, capability indices #4 and #5 both correspond to UE panel Panel_4, and are not mapped to respectively different channel conditions that may be experienced by UE panel Panel_4.

Corresponding panels 416 are shown in FIG. 4A for the purpose of illustrating, for each capability index, the UE panel to which the capability index corresponds. However, according to at least some example embodiments, the indices 412, themselves, identify the UE panels to which the indices correspond within the capability set 410, and thus, the capability set 410 does not include the corresponding UE panels 416.

2. The UE 106 may receive the configuration of downlink RSs for measuring the feasible beam pair links for the downlink and uplink beam selection. According to at least some example embodiments, this process could be joint DL and UL or separate DL and UL.

3. The UE 106 may measure DL RSs based on the received configuration and determine the best M DL RSs resources according to configured criteria and associate DL RSs per capability index of the certain functionality, where M is a positive integer. (S310)

According to at least some example embodiments, criteria for determining the best M DL RSs can be at least one the following: L1-reference signal received power (RSRP), L1-signal-to-interference-plus-noise ratio (SINR), power head room, or indication of MPE event and its severity (e.g. reported power management maximum power reduction (P-MPR) in power headroom report (PHR) on serving beam or estimated P-MPR in virtual PHR on candidate beams) and/or time span; or a combination thereof.

4. The UE 106 may start a timer. For example, according to at least some example embodiments, the UE 106 may start the time from the time instant the UE 106 makes the measures the DL RSs based on the received configuration. (S320)

5. The UE 106 may associate the best M DL RSs to each capability index so that, for each capability index, the M DL RSs associated with the capability index are the ones that can be measured with the UE panel that corresponds to the capability index, from among the UE panels 1062~1068 of the UE 106.

According to at least some example embodiments, at the UE side the corresponding UE panel may be one or multiple physical antenna panels of the UE 106.

According to at least some example embodiments, the UE 106 may also determine DL RS(s) for a default operation, i.e. fallback DL RSs that are not associated to any capability indices.

According to at least some example embodiments, the fallback DL RS(s) are defined implicitly e.g. from the SSB index used as a QCL source for the CORESET #0 or from DL RS in the active TCI state of the lowest CORESET index other 0.

6. The UE 106 may report the best DL RSs per associated capability index of the certain functionality to the gNB 102 (S330). For example, FIG. 4B illustrates an example of a downlink (DL) reference signal (RS) set 420 according to at least some example embodiments. According to at least some example embodiments, the UE 106 may report the DL RS set 420 to the gNB 102 in step S330.

The DL RS set 420 may include the plurality of capability indices 412 and a plurality of DL RSs 418. According to at least some example embodiments, the DL RS set may include, for each capability index among the plurality of capability indices 412, the M DL RS(s) that were determined to be the best for the UE panel to which the capability index corresponds (e.g., in step S310). For ease of description, in the example illustrated in FIG. 4B, M=1. Accordingly, for each index, the DL RS set includes 1 DL RS. However, M may be an integer greater than 1. Accordingly, the DL RS set 420 may include multiple DL RSs corresponding to the same capability index from among the plurality of capability indices 412.

Corresponding UE panels 416 are shown in FIG. 4B for the purpose of illustrating, for each capability index, the UE panel to which the capability index corresponds. However, according to at least some example embodiments, the indices 412, themselves, identify the UE panels to which the indices correspond within the DL RS set 420, and thus, the DL RS set 420 does not include the corresponding UE panels 416.

According to at least some example embodiments, the UE 106 can be configured to measure/track and report only UL/DL RS resources used as spatial source for a set of activated UL/DL or joint UL and DL TCI states and their respective associated capability index. Alternatively, according to at least some example embodiments, the UE 106 can be configured to measure/track and report only UL/DL RS resources used as a spatial source for UL/DL resources and resource sets within aperiodic triggering states for UL SRS or DL CSI-RS. Alternatively, according to at least some example embodiments, the UE 106 can be configured to measure/track and report only RS resources corresponding to a given capability index.

7. The UE 106 may receive a mapping of reported DL RSs to Rx beam and/or Tx beam assumptions for the DL and/or UL resources, respectively. (S340)

8. The UE 106 may receive DL signals/channels based on provided Rx beam assumptions and/or transmit UL signals/channels based on the provided Tx beam assumptions. (S350)

9. The UE 106 may determine if the timer started by the UE 106 (e.g., in step S320) has expired (S360). If the UE 106 determines the timer has not expired, the UE 106 may repeat the measuring of the DL RSs based on the received configuration and determination of the best M DL RSs resources (e.g., step S310).

10. If the UE 106 determines the timer has expired, the UE 106 may reset the timer, discard the received mapping (e.g., the mapping received in step S340) and apply the fallback RSs to the Rx beam and/or Tx beam assumptions for the DL and/or UL resources. (S370)

11. Next, the UE 106 may receive DL signals/channels based on the applied fallback Rx beam assumptions and/or Tx UL signals/channels based on the applied fallback Tx beam assumptions. (S380)

Next, the UE 106 may repeat the measuring of the DL RSs based on the received configuration and determination of the best M DL RSs resources (e.g., step S310).

Figure 6A:
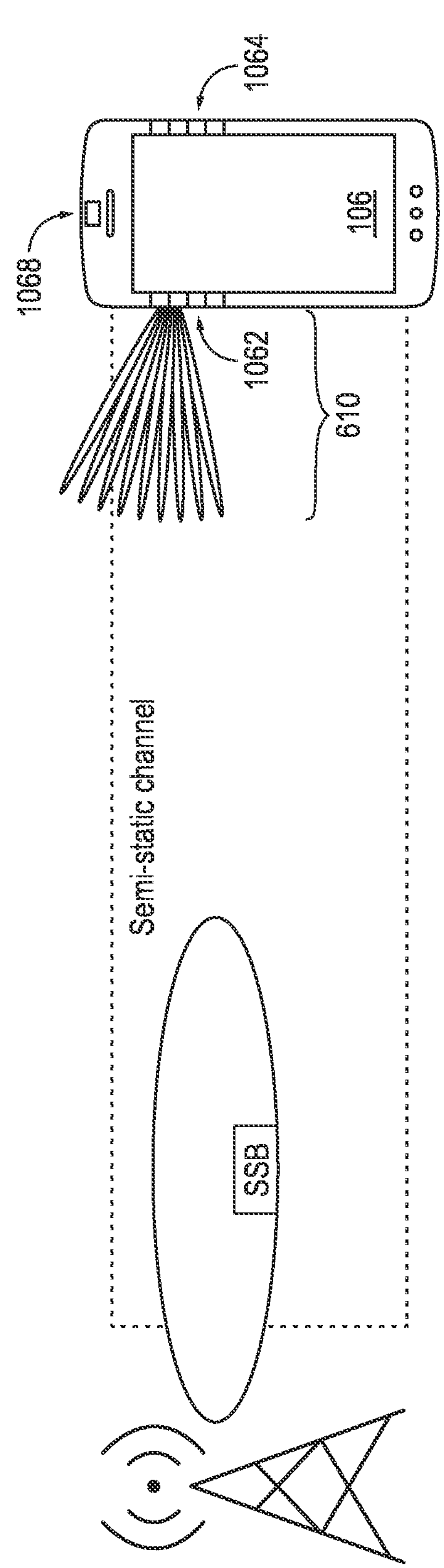
Figure 6B:
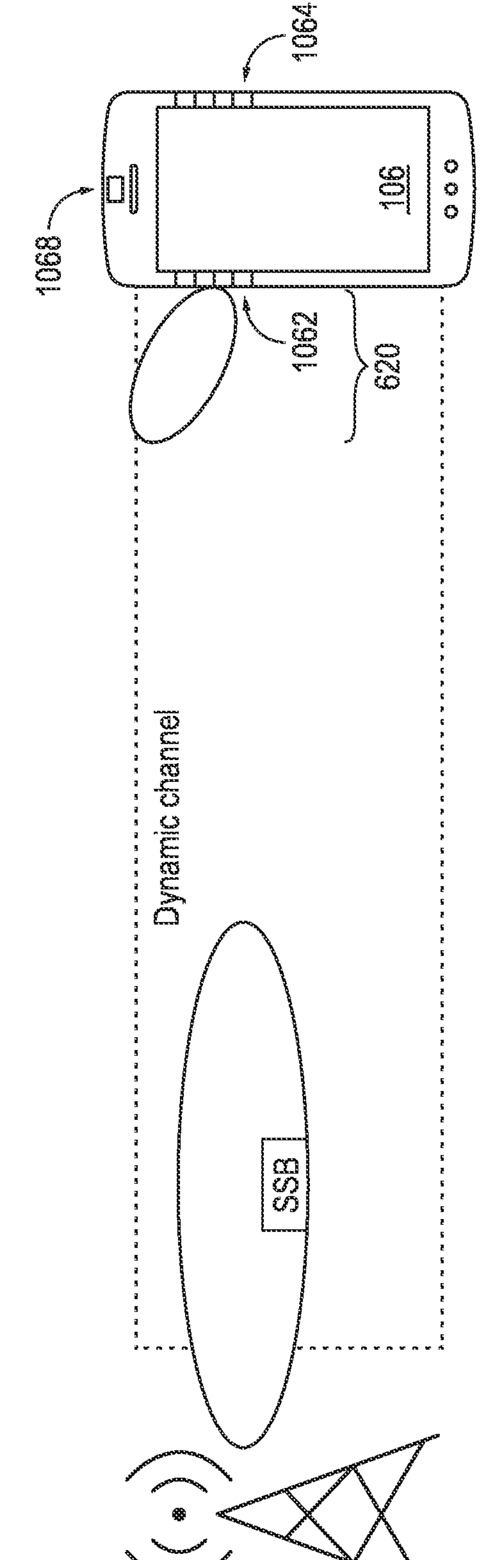

According to at least some example embodiments, there may be one or more timer reset triggers that cause the UE 106 (or gNB 102) to reset the timer and perform steps S370 and S380 (e.g., at step S360) even if the timer has not yet expired. For example, FIGS. 5, 6A and 6B are diagrams for explaining example timer reset triggers according to at least some example embodiments. FIGS. 5, 6A and 6B each illustrate the first TRP 102A and the UE 106 of the wireless communications system 100 of FIG. 1. As is discussed above with respect to FIG. 1, the first TRP 102A is a TRP of the gNB 102. Example timer reset triggers will now be discussed in greater detail below. Though three example timer reset triggers are discussed below, at least some example embodiments are not limited to the three example timer reset triggers discussed below. For example, example timer reset triggers other than the examples provided below may be implemented.

Example Timer Reset Trigger #1

In Example Timer Reset Trigger #1, a spatial orientation the UE 106 changes, thus potentially changing which DL RS(s) are received by each of one or more panels of the UE 106 from the gNB 102 (e.g., via one or more of TRPs 102A-102C).

As is illustrated in FIG. 5, the first TRP 102A may transmit a synchronization signal block (SSB). Further, in the example illustrated in FIG. 5, the UE rotates on itself in a counterclockwise direction. Accordingly, a serving gNB beam (DL RS) that was previously received by the first UE panel 1062 may now be received by the third UE panel 1068. If the first and third panels 1062 and 1068 have different capabilities (e.g., NumberOfRxBeams[1]=8 and NumberOfRxBeams[2]=2, respectively, where capability index #1 corresponds to the first panel 1062 and capability index #2 corresponds to the third panel 1068), then the same DL RS will be first associated to NumberOfRxBeams[1]=8 and then to NumberOfRxBeams[2]=2. Further, while the DL RS originally received by the first panel 1062 may have been desirable for a panel having a NumberOfRxBeams of 8, the DL RS originally received by the first panel 1062 may not be desirable for a panel having a NumberOfRxBeams of 2 (i.e., the third panel 1068). Thus, according to at least some example embodiments, upon detecting a change in orientation (e.g., a change in orientation that may change which DL RS(s) are received by which UE panels, such as the rotation illustrated in FIG. 5): the UE 106 may trigger the timer to reset; switch to applying the fallback RS(s) to the Rx beam(s) and/or Tx beam(s) of the UE 106 (S370); receive DL signals and/or transmitting Tx signals based on the applied fallback RS(s) (S380); and repeat the measuring of DL RSs and determination of the M best DL RSs per capability index (S310), for example, with respect to the new orientation of the UE 106.

Example Timer Reset Trigger #2

In Example Timer Reset Trigger #2, channel conditions experienced by at least one panel of the UE 106 may change from a semi-static state to a very dynamic state.

For example, in the example illustrated in FIGS. 6A and 6B, the first panel 1062 of the UE 106 may be a 1×4 array with 8 beams. FIG. 6A illustrates an example of a semi-static environment with respect to the channel conditions experienced by the first UE panel 1062 and FIG. 6B illustrates an example of a very dynamic environment with respect to the channel conditions experienced by the first UE panel 1062. As is illustrated in FIGS. 6A and 6B, the first UE panel 1062 may use 8 Rx beams 610 in the semi-static environment and use only 2 Rx beams 620 in the very dynamic environment.

Specifically, referring to FIG. 6A, in a semi-static environment the UE 106 may report NumberOfRXBeams[1]=8 because the first UE panel 1062 may be able to sequentially measure all of its 8 beams 610 and align with the best beam. However, referring to FIG. 6B, in a very dynamic environment, the same UE panel 1062 may see multiple clusters changing in power rapidly. From a Delay Power Profile evaluation, the UE 106 may know that it cannot align its narrow beam in current coherence estimation of the channel. Therefore, the UE 106 may report for example NumberOfRXBeams[2]=2 because the UE 106 determines that 2 beams is a desirable number of beams for the very dynamic channel conditions. Thus, the first U panel 1062 of the UE 106 may receive DL signals via the 2 Rx beams 620 in the very dynamic environment.

Example Timer Reset Trigger #3

In Example Timer Reset Trigger #3, the resetting of the timer may be initiated by the gNB 102. For example, the timer may be reset by the gNB 102 upon consecutive reports presenting differences (e.g. reported RSRP/SINR) higher than a threshold, resulting from e.g. a multi-cluster dynamic environment.

According to at least some example embodiments, both the UE 106 and the gNB 102 include a timer. According to at least some example embodiments, when the timer at the UE 106 is reset (i.e., due to expiration or, alternatively, a timer reset trigger event): the UE 106 stops using current DL RS(s) and starts using fallback RS(s)(S370); receives DL signals using the fallback RS(s) (S380); re-determines M best DL RSs for each capability index (S310); starts the timer again (S320); and reports the newly determined M best DL RSs of each capability index to the gNB 102 (S330), e.g., by sending a capability set 410 to the gNB 102.

According to at least some example embodiments, when the timer at the gNB 102 is reset (i.e., due to expiration or, alternatively, a timer reset trigger event), the gNB 102 may transmit a request to the UE 106 for the UE 106 to report its current M best DL RSs of each capability index to the gNB 102 or, alternatively, transmit a request to the UE 106 for the UE 106 to determine new M best DL RS(s) for each capability index and report the newly determined M best DL RS(s) for each capability index to the gNB 102. For example, the gNB may transmit a request that cases the UE 106 to perform one or more of steps S370, S380, S310, S320 and S330 discussed above.

Below, in sections 4a-4e, a number of different specific example implementations of the method for facilitating beam management for an MP-UE according to at least some example embodiments are explained.

4a. Example Implementation for UE Rx Beam Training (Aka P3 Procedure):

1. UE provides the gNB with set of capabilities for the P3 functionality like maxNumberRxBeam0(index #0):=4 maxNumberRxBeam1(index #1):=8 maxNumberRxBeam2(index #2):=2

2. gNB configures UE with DL RSs (SSBs and/or CSI-RSs) for L1-RSRP/L1-SINR measurements and reporting.
3. UE measures DL RS resources per index in step 1 where the index may associate to a UE panel entity (logical entity).
   - UE starts timer for the validity of the association between DL RSs and capability indices.
4. UE determines best MDL RSs per capability index (provided in step 1) and UE reports the DL RSs (M is assumed to be 2 in this example).
   - Criteria for determining the best DL RSs per capability index could be e.g. reference signal received power (dBm) that UE has measured using the receive panel associated to a capability index.
   - Report could be like:
     - index #0: DL RS #b, DL RS #t
     - index #1: DL RS #d, DL RS #g
     - index #2: DL RS #e DL RS #h
   - In one option, the UE also reports the DL RS(s) for the fallback operation.
   - In another option, the UE orders the capability indices with corresponding RSs so that the first set of DL RSs act as fallback RSs after the timer expiry.
5. gNB gets aware per capability index of the feasible DL RSs and may select one of the M reported RSs per capability index as QCL source per configured CSI-RS resource set with repetition "ON."
   - the gNB may update the QCL source of the certain resource set with the new DL RS based on the report.
6. If the timer is reset (by UE based on UE condition or by gNB based on reports) or is expired associated to reported DL RSs that were associated to the capability indices, the gNB and UE assume the fallback operation.
   - In the fallback operation, the association between DL RSs and capability indices is not valid and the UE applies the fallback RS(s) to determine RX beam for the downlink signal receptions and/or TX beam for the uplink signal transmissions.

4b. Example Implementation for Codebook Based PUSCH Transmission:

1. UE provides capability set in terms of the number of ports it would support per SRS resource:

nrOfPorts0(index #0):=1 nrOfPorts1(index #1):=2

2. When configured, UE performs L1-RSRP measurements and reporting of best DL RSs conditional to the configuration of the SRS resource set with usage set to "codebook" based:
   - Upon measurements UE starts timer for the validity of the association between DL RSs and capability indices
   - UE reports best M DL RSs that would be feasible spatial source for the certain SRS resource in the SRS resource set.
     - M could be {1, 2, 3, 4}
     - Conditional condition means that the UE would report separately DL RSs that would be feasible spatial sources for the SRS resource #0/associated to the capability index 0, separately for the SRS resource #1/associated to the capability index 1, and so on, of the configured SRS resource set with usage set to "codebook."
     - The UE may report then multiple sets of DL RSs, each set corresponding to the certain SRS resource/associated to the capability index in the SRS resource set.
     - Criteria for determining the best DL RSs per capability index could be e.g. virtual power headroom or estimated UL RSRP value. That is to take into account potential uplink transmission power capability into account. E.g. MPE issue may prevent the UE to use the transmission power that based on only DL RSRP measurement would be required. In general, the selected DL RSs would be the ones that would also allow UE to use enough transmission power for the UL transmission.
   - UE may also report fallback RS(s). These would be selected also so that the UE can use high enough transmission power using the TX beam based on the selected RSs, e.g. from MPE point of view.
   - gNB can assume that the UE measures the reported DL RSs using the antenna panel that the UE would use also for the certain SRS resource transmission.
   - This reporting could be a separate reporting different from the L1-RSRP (measurement and) reporting of best DL RSs for the DL TX beam selection.
3. UE receives triggering of the SRS resource set and performs transmission accordingly.
4. If the timer is reset (by UE based on UE condition or by gNB based on reports) or is expired the UE and gNB falls to fallback operation where the SRS resource set with different number of ports is not valid, or the number of ports is set to the same (e.g. to minimum of UE provided multiple values) and the fallback RS(s) are used to determine TX beam for each SRS resource.

4c. Example Implementation for the Activation of the Joint DL/UL or Separate DL or UL TCI States (in the Following Just a TCI State)

1. UE provides capability set in terms of the activation delays:

*a*. activationDelayGroup0(index #0):=*X*

*b*. activationDelayGroup1(index #1):=*Y*(*Y*>*X*)

2. UE groups the measured DL RSs that would be feasible spatial sources in the TCI state into groups where the DL RSs within each group is associated to the activationDelayGroup0 and DL RSs of the different groups are associated to the activationDelayGroup1.
   a. The latter means that activating or switching to the TCI state having DL RS from the different group than the DL RS of the current active UL TCI state would require time Y. If the DL RS of the TCI state to be activated is from the same group as DL RS of the current active TCI state, the activation would require time X.
   b. Upon measurements UE starts timer for the validity of the association between DL RSs and capability indices.
3. UE reports the groups that are formed as described in above step
4. UE and gNB has a common understanding of the application time of the activation of the TCI based.
   a. If the UE receives activation of the TCI state in which the DL RS as QCL/spatial source has been reported to be in the same group as DL RS of the current active TCI state, the application time is X.
   b. Otherwise the application time is Y.
5. If the timer is reset (by UE based on UE condition or by gNB based on reports) or is expired the UE and gNB falls to fallback operation where the application time is Y.

4d. Example Implementation for the Selection of the Joint DL/UL or Separate DL or UL TCI States (in the Following Just a TCI State)

1. UE provides capability set in terms of the TCI state selection delays:

*a*. selectionDelayGroup0(index #0):=*W*(*W*<*X*)

*b*. selectionDelayGroup1(index #1):=*Z*(*Z*>*W*; *Z*<*X*)

2. UE groups the measured DL RSs that would be feasible spatial sources in the TCI state into groups where the DL RSs within each group is associated to the selectionDelayGroup0 and DL RSs of the different groups are associated to the selectionDelayGroup1.
   a. The latter means that selecting the TCI state having DL RS from the different group than the DL RS of the current selected TCI state would require time Z. If the DL RS of the TCI state to be selected is from the same group as DL RS of the current selected TCI state, the selection would require time W.
   b. Here the groups could be subgroups within the groups defined in the activation functionality above
      i. E.g. in the activation functionality the group size could be 4 and here the UE may report 2 subgroups of size 2. DL RSs of each subgroup would be associated to the selectionDelayGroup0 and DL RSs of different subgroups are associated to the selectionDelayGroup1.
   c. Upon measurements UE starts timer for the validity of the association between DL RSs and capability indices.
3. UE reports the groups that are formed as described in above step
4. UE and gNB has a common understanding of the application time of the selection of the TCI based.
   a. If the UE receives selection indication of the TCI state in which the DL RS as QCL/spatial source has been reported to be in the same group as DL RS of the current selected TCI state, the application time is W.
   b. Otherwise the application time is Z.
5. If the timer is reset (by UE based on UE condition or by gNB based on reports) or is expired the UE and gNB falls to fallback operation where the application time is Z.

4e. Example Implementation for Maximum Achievable EIRP (this Will not be an Absolute Value but a Relative Value to the Different Panels on the UE)

1. UE provides the gNB with set of capabilities for maximum achievable EIRP like maximumEIRP0(index #0):=0 maximumEIRP1(index #1):=3 maximumEIRP2(index #2):=6 where the value does not reflect the dBm value but a relative value between antenna arrays in dB. For example, one panel is built with a single-element, thus would be only exhibit maximumEIRP0; another panel is built is 1×2 antenna array and could exhibit beams with up to 3 dB higher gain, thus a maximumEIRP1. Lastly, a 1×4 antenna array could exhibit beams with 6 dB higher gain than the single-element panel and could be associated to maximumEIRP2.

2. gNB configures UE with DL RSs (SSBs and/or CSI-RSs) for L1-RSRP/L1-SINR measurements and reporting.
3. UE measures DL RS resources and associates an index in step 1 per reported DL RS.
4. Upon measurements UE starts timer for the validity of the association between DL RSs and capability indices.
5. gNB gets aware per capability index of the feasible DL RSs and may select one of the M reported RSs per capability index as QCL source per configured CSI-RS resource set with repetition "ON."
   the gNB may update the QCL source of the certain resource set with the new DL RS based on the report.
6. If the timer is reset (by UE based on UE condition or by gNB based on reports) or is expired the UE and gNB falls to fallback operation where the maximum EIRP is unknown or a minimum value.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided above to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing UE, base stations, eNBs, RRHs, gNBs, femto base stations, network controllers, computers, Central Units (CUs), ng-eNBs, other radio access or backhaul network elements, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, UEs, base stations, eNBs, RRHs, gNBs, femto base stations, network controllers, computers, Central Units (CUs), ng-eNBs, other radio access or backhaul network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A user equipment (UE), of a wireless communications system, comprising:

a plurality of antenna panels;

at least one memory storing computer-executable instructions; and at least one processor configured to execute the computer-executable instructions, wherein the computer-executable instructions, when executed, cause the UE at least to perform:

generating at least a first capability set of a first functionality for facilitating a dynamic association between reference signals configured for beam management measurements and reporting, for downlink beam selection, or uplink beam selection, or both downlink beam selection and uplink beam selection, and semi-statically configured capability indices of a capability set of at least one functionality, wherein the first capability set includes a plurality of capability information items indexed, respectively, by a plurality of corresponding capability indices, wherein each capability information item indicates, for a panel corresponding to the capability information item from among the plurality of antenna panels, capability information of the corresponding panel with respect to the first functionality;

transmitting the first capability set to a next generation node B (gNB) included in the wireless communications system;

receiving and measuring downlink reference signals from the @NB;

starting a timer after measuring the downlink reference signals;

determining, for each capability index from among the plurality of capability indices included in the first capability set, one or more best downlink reference signals from among the received downlink reference signals;

determining one or more fallback reference signals, from among the received downlink reference signals, for a fallback operation;

reporting, to the gNB, each capability index along with the one or more best downlink reference signals determined for each capability index;

reporting, to the gNB, the one or more fallback reference signals;

determining, based on the one or more best downlink reference signals determined for a capability index from among the plurality of capability indices, an Rx beam for receiving downlink signals or a Tx beam for transmitting UL signals, or the Rx beam for receiving downlink signals and the Tx beam for transmitting UL signals;

determining whether the timer has expired; and in response to determining the timer has expired, performing the fallback operation, the fallback operation including, determining, based on the one or more fallback reference signals, a new Rx beam for receiving downlink signals or a new Tx beam for transmitting uplink signals or the new Rx beam for receiving downlink signals and the new Tx beam for transmitting uplink signals.

2. The UE of claim 1, wherein the plurality of capability information items included in the first capability set includes at least first and second capability information items indexed by first and second indices, respectively, from among the plurality of capability indices, wherein the first capability information item indicates capability information of a first panel, from among the plurality of antenna panels, with respect to the first functionality, and wherein the second capability information item indicates capability information of a second panel, from among the plurality of antenna panels, with respect to the first functionality, the second panel being different than the first panel.

3. The UE of claim 1, wherein the plurality of capability information items included in the first capability set includes at least first and second capability information items indexed by first and second indices, respectively, from among the plurality of capability indices, wherein the first capability information item indicates capability information of a first panel, from among the plurality of antenna panels, with respect to the first functionality and first downlink or uplink channel conditions, or the first downlink and uplink channel conditions, and wherein the second capability information item indicates capability information of the first panel with respect to the first functionality and second downlink or uplink channel conditions, or the second downlink and the second uplink channel conditions, the second downlink or uplink channel conditions, or the second downlink and uplink channel conditions being different than the first downlink conditions or uplink channel conditions, or the first downlink and uplink channel conditions.

4. The UE of claim 1, wherein the first functionality is at least one of a maximum number of Rx beams, a number of ports, activation delay group information, selection delay group information, or a maximum achievable equivalent isotropically radiated power.

5. A method of operation a user equipment (UE), of a wireless communications system, the UE including a plurality of antenna panels, the method comprising:

generating at least a first capability set of a first functionality for facilitating a dynamic association between reference signals configured for beam management measurements and reporting, for downlink beam selection, or uplink beam selection, or both downlink beam selection and uplink beam selection, and semi-statically configured capability indices of a capability set of at least one functionality, wherein the first capability set includes a plurality of capability information items indexed, respectively, by a plurality of corresponding capability indices, wherein each capability information item indicates, for a panel corresponding to the capability information item from among the plurality of antenna panels, capability information of the corresponding panel with respect to the first functionality;

transmitting the first capability set to a next generation node B (gNB) included in the wireless communications system;

receiving and measuring downlink reference signals from the &NB;

starting a timer after measuring the downlink reference signals;

determining, for each capability index from among plurality of capability indices in the in the capability set, one or more best downlink reference signals from among the received downlink reference signals;

determining one or more fallback reference signals, from among the received downlink reference signals, for a fallback operation;

reporting, to the gNB, each capability index along with the one or more best downlink reference signals determined for each capability index;

reporting, to the gNB, the one or more fallback reference signals;

determining, based on the one or more best downlink reference signals determined for a capability index from among the plurality of capability indices, an Rx beam for receiving downlink signals or a Tx beam for transmitting uplink signals or the Rx beam for receiving downlink signals and the Tx beam for transmitting uplink signals;

determining whether the time has expired; and in response to determining the timer has expired, performing the fallback operation, the fallback operation including, determining, based on the one or more fallback reference signals, a new Rx beam for receiving downlink signals or a new Tx beam for transmitting uplink signals or the new Rx beam for receiving downlink signals and the new Tx beam for transmitting uplink signals.

6. The method of claim 5, wherein the plurality of capability information items included in the first capability set includes at least first and second capability information items indexed by first and second indices, respectively, from among the plurality of capability indices, wherein the first capability information item indicates capability information of a first panel, from among the plurality of antenna panels, with respect to the first functionality, and wherein the second capability information item indicates capability information of a second panel, from among the plurality of antenna panels, with respect to the first functionality, the second panel being different than the first panel.

7. The method of claim 5, wherein the plurality of capability information items included in the first capability set includes at least first and second capability information items indexed by first and second indices, respectively, from among the plurality of capability indices, wherein the first capability information item indicates capability information of a first panel, from among the plurality of antenna panels, with respect to the first functionality and first downlink or uplink channel conditions or the first downlink and uplink channel conditions, and wherein the second capability information item indicates capability information of the first panel with respect to the first functionality and second downlink or uplink channel or second downlink and uplink channel conditions, the second downlink or uplink channel conditions being different than the first downlink or uplink channel conditions.

8. The method of claim 5, wherein the first functionality includes at least one of a maximum number of Rx beams of the panel, a number of ports of the panel, activation delay group information of the panel, selection delay group information of the panel, or a maximum achievable equivalent isotropically radiated power of the panel.

* * * * *